June 21, 1938.   G. C. SHIPLEY   2,121,177
ELECTRIC FAN
Filed Feb. 11, 1937   2 Sheets-Sheet 1
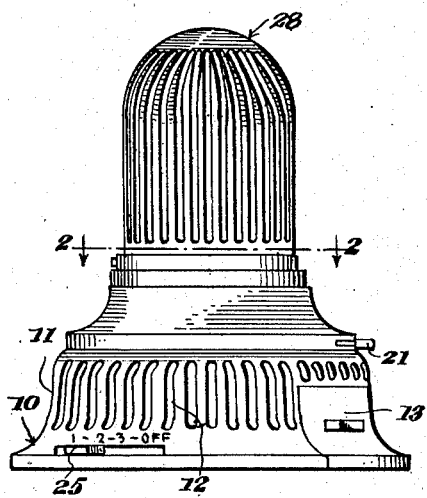
Fig. 1.
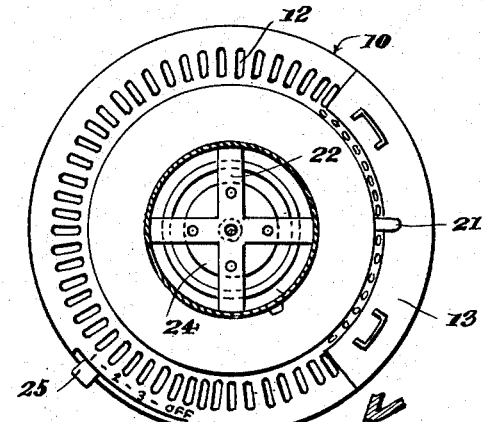
Fig. 2.
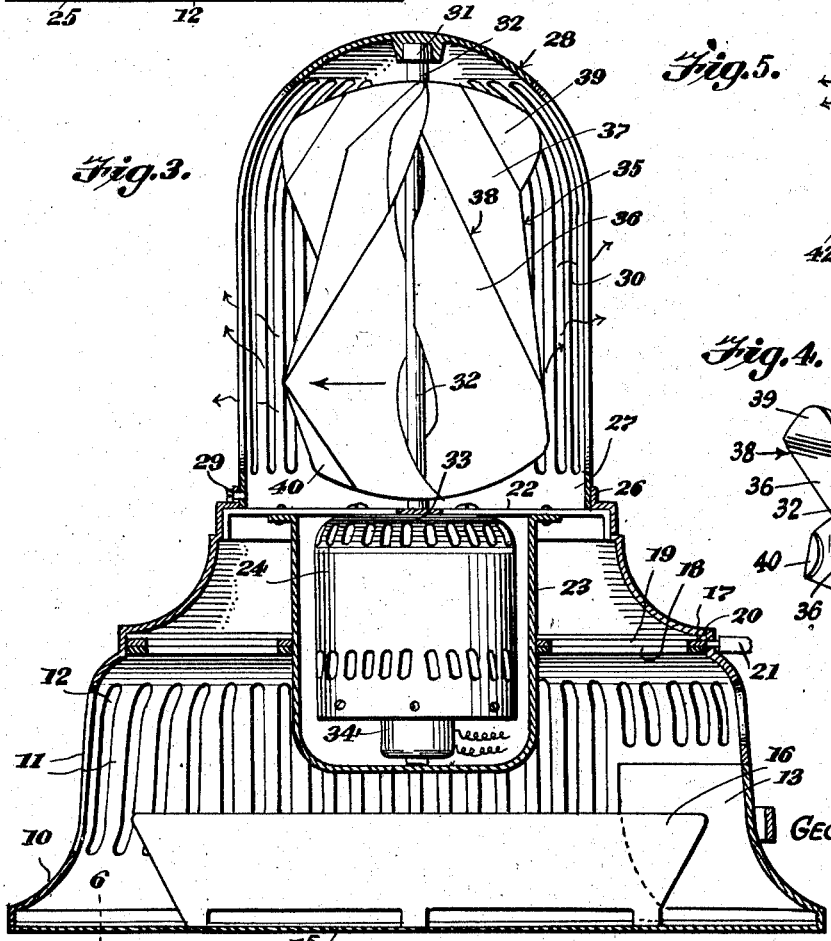
Fig. 3.
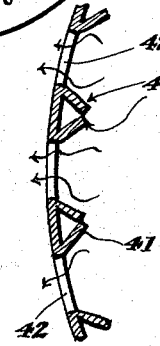
Fig. 5.
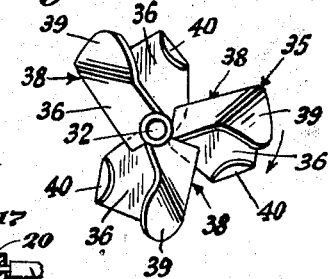
Fig. 4.
Fig. 6.
Inventor
GEORGE C. SHIPLEY
By Irving L. McCathran
Attorney June 21, 1938.　　　　　G. C. SHIPLEY　　　　　2,121,177
ELECTRIC FAN
Filed Feb. 11, 1937　　　　　2 Sheets-Sheet 2
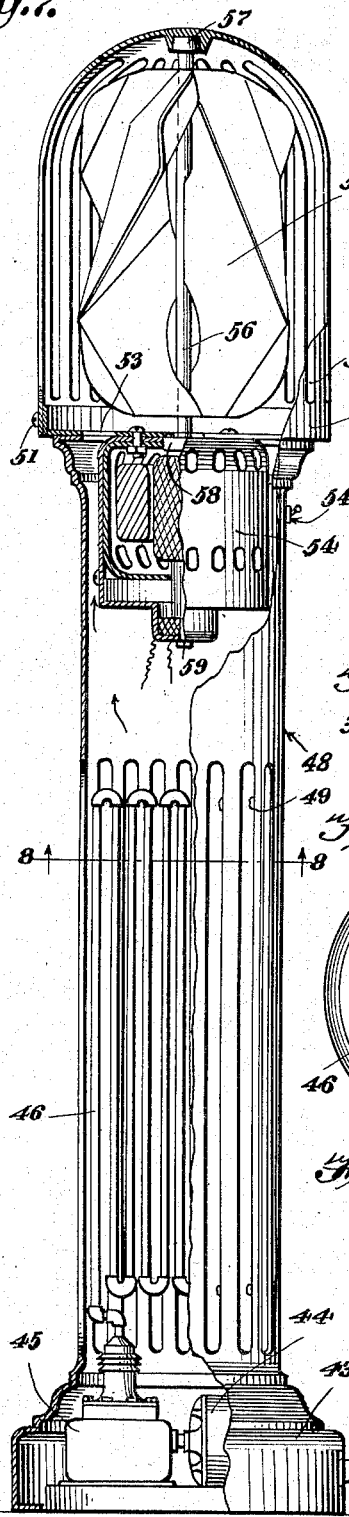
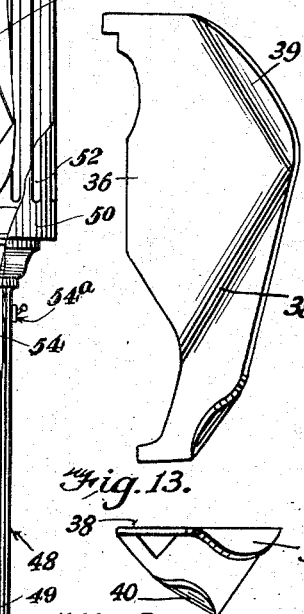
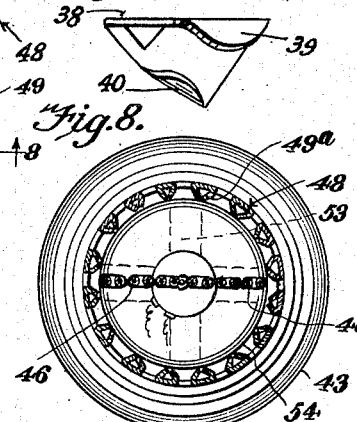
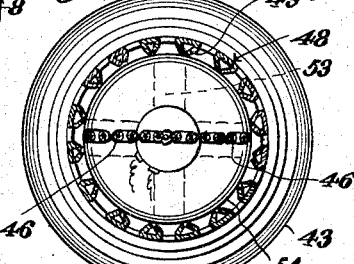
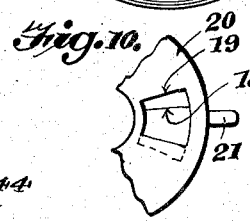
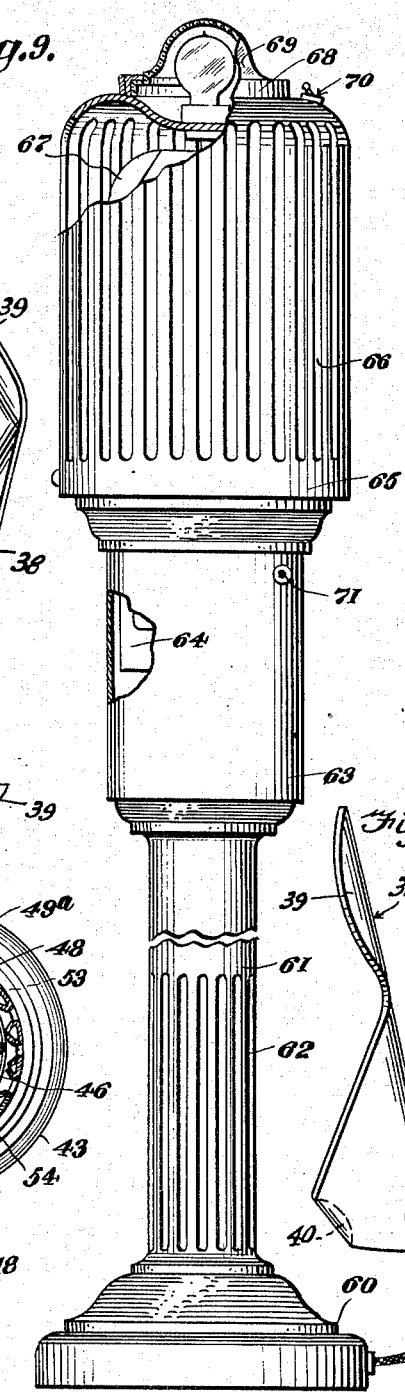
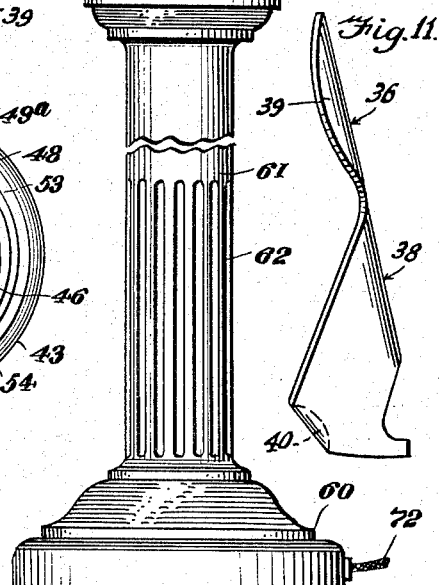
Inventor
GEORGE C. SHIPLEY
By　*Irving A. McCathran*
Attorney Patented June 21, 1938

2,121,177

UNITED STATES PATENT OFFICE 2,121,177

ELECTRIC FAN

George Conwell Shipley, San Antonio, Tex., assignor of twenty-five percent to Fred Turner, Jr., Midland, Tex.

Application February 11, 1937, Serial No. 125,333

5 Claims. (Cl. 230—274)

This invention relates to electric fans, and has for one of its principal objects the production of a simple and efficient portable electric fan which is shielded within a housing in a manner whereby the air from the fan will circulate in a direct current from the center and radiate outwardly through openings in the side of the housing.

A further object of this invention is the production of a fan which may be used as a medium for the distribution of insecticide (dry or liquid), the fan having means for drawing a current of air over or across the insecticide for saturating the air current and the like, and then radiating the saturated air current from the center outwardly by discharging the air current through openings formed in the side of the housing surrounding the fan.

A still further object of this invention is the production of a fan which may be used as a medium for conditioning air, in a manner whereby air is passed over or through a heating or other conditioning unit by being drawn through vents or openings near the bottom of the housing thereof and drawn upwardly and then radiated from the center outwardly through vents or openings formed near the top of the housing.

Another object of this invention is the production of a combination electric fan and a direct or indirect lighting means formed in the top of the housing supporting the fan, the parts being so constructed as to permit of the convenient assembly or removal of the same for the purpose of repair or replacement.

Other objects and advantages of the present invention will appear throughout the following specification and claims.

In the drawings:

Figure 1 is a side elevation of my improved fan housing;

Figure 2 is a horizontal sectional view taken on line 2—2 of Figure 1, looking in the direction of the arrow;

Figure 3 is an enlarged central vertical sectional view of the housing structure, the fan and motor therefor being shown in side elevation;

Figure 4 is a top plan view of the fan;

Figure 5 is an enlarged transverse sectional view through one of the vented side walls of the housing;

Figure 6 is a fragmentary sectional view taken on line 6—6 of Figure 3;

Figure 7 is a side elevation of a modified form of fan housing, certain parts being shown in vertical section;

Figure 8 is a horizontal sectional view taken on line 8—8 of Figure 6, looking in the direcion of the arrow;

Figure 9 is a side elevation of a further modified form of the invention certain parts being shown in section and illustrating a lighting means in combination with the fan unit;

Figure 10 is a fragmentary top plan view of the air shut-off used in connection with this invention;

Figure 11 is an edge elevation of one of the blades detached from the supporting shaft;

Figure 12 is a side elevation of one of the blades looking at right angles to Figure 11;

Figure 13 is a top plan view of one of the blades.

By referring to the drawings, it will be seen that 10 designates a circular base which is provided with an upstanding wall 11 having vertically extending vents or slots 12 formed therein for the purpose of admitting air into the base 10. The base 10 is provided with a sliding drawer 13 which may be slidably mounted in any convenient manner, such for instance as through the medium of the trackway 14, shown in detail in Figure 6. The drawer 13 is provided with a bottom 15 upon which may rest a tray 16 for containing insecticide, perfume, water, or any suitable material or substance. This substance may be in the nature of a liquid, powder, or dust.

The base 10 may be suitably designed and carries a shut-off 17 located above the vents or slots 12 in the nature of a circular plate having vent openings 18 which are adapted to register with vent openings 19 formed in a coacting rotating plate 20, which rotating plate 20 may be actuated by a suitable handle 21 for opening and closing the shut-off, the size of the openings being regulated by the movement of the plate 20 to control the amount of air passing through the shut-off 17. The shut-off 17 may be varied as to its structural features without departing from the spirit of the invention. The base 10 is preferably gradually reduced in its circumference as it nears its top to provide a suitable structure which will not have a tendency to topple over.

The base 10 carries near the top thereof and above the shut-off 17 a plurality of cross-braces 22 from which is suspended a motor carrying housing 23 in which is mounted an electric motor 24, which electric motor may be controlled by a suitable control switch 25 of the conventional type, such as is used upon electric fans and the like, in conjunction with a rheostat for providing varied degrees of speed, the various positions being indicated by the numerals 1, 2 and 3, and the letters OFF. The housing 23 is suspended below the cross-braces 22 centrally of the base 10 and extends down through the shut-off 17, as shown, the shut-off 17 also providing a bracing means for the housing intermediate its ends.

The base 10 is provided with an upstanding annular collar 26 within which fits the lower end 27 of the fan shielding dome 28, a set screw 29 being provided upon the annular collar 26 for binding and locking the dome in position. The dome 28 is provided with vertically extending closely arranged vents or slots 30 which extend through a major portion of the height of the dome as shown in the drawings. A suitable bearing 31 is provided at the top of the dome for receiving the upper end of the fan shaft 32, the fan shaft 32 being carried by the motor 24 and having a bearing approximately at the point 33 in the motor 24 and at the point 34, as is common with such motors. It is not desired to limit the present invention to any particular type of motor but it is important that the fan shaft which supports the fan 35 extend in a vertical position centrally of the dome 28, as shown in detail in Figure 3.

The fan 35 preferably comprises three specially constructed fan blades 36 which are arranged at equal distances apart and extend vertically of the shaft 32. Each blade comprises an elongated body having an angularly bent fin 37 bent at a radical angle along the inclined line 38 which terminates at its upper corner in an angularly bent tongue 39. The lower outer corner of each blade 36 is provided with an oppositely bent tongue 40, as shown in Figure 3. The purpose of this fan 35 is to draw the air up from the base after it enters the vents 12 and into the dome 28, this drawing action being accomplished by the lower portion of the blades 36, and the tongues 40 at the lower ends of the blades, the upper portions and particularly the upper tongues 39 constituting means for driving the air out through the vents 30 in the dome 28, in this way providing an efficient outward radiation of the air from the center outwardly in all directions covering a maximum area.

The upper and lower portions of the fan blade extend substantially at right angles to each other, the lower portion being bent forwardly in the direction of rotation so as to draw the air upwardly longitudinally of the blades of the fan, the blades being elongated vertically and the upper portion of the blade in each instance will force the air from the center outwardly through the vents.

It should be understood that the present device is especially adapted as an air conditioning medium wherein water, insecticide, perfume, or other substance may be inserted in the pan or tray 16. By drawing a blast of air through the vents 12 through the action of the fan 35, a current of air will be drawn across the surface of the contents of the tray 16 and up through the base into the dome 28, and then blown out through the vents 30, in this way humidifying, perfuming, or disinfecting the air surrounding the fan, the blast of air being broken up into a plurality of vertically extending streams and radiating from the center outwardly in all directions by being forced out through the vents 30.

As shown in Figure 5, the vents may be, if desired, formed by bending the flanges 41 which are formed by cutting out the vents 42 backwardly to provide substantially V-shaped walls or abutments against which the air which moves radially outward may be forced and then directed out through the vents 42 in the manner indicated by the arrows in Figure 5. It should be understood that the vents may be formed by punching longitudinally extending slots or openings in the dome and base, as shown in detail in Figure 3, or may be formed in the manner shown in Figure 5 in detail, the structure shown in Figure 5 being found preferable and of advantage in many cases.

In Figure 7, there is shown a modified form of the invention wherein a base 43 is illustrated containing a motor 44 and a compressor or pump 45 in conjunction with a vertically arranged conditioning coil 46 which may be utilized as a cooling or as a heating medium without departing from the spirit of the invention. The motor 44 may be connected in any suitable or desired manner to an electrical supply line 47. The vertically arranged conditioning 46 is placed within a vertical column 48 carried by the base 43, which column is provided with vertically extending closely arranged vents or slots 49 which are formed therein in any suitable or desired manner, the cut-out portions being bent back to provide air deflecting flanges 49ª, if desired, in a manner shown in Figure 8 similar to that as described in Figure 5. These deflecting flanges 49ª may or may not be employed without departing from the spirit of the invention and the slots 49 may be cut out in a manner shown in Figure 7 or the deflecting flanges may be formed from the cut-out portions in the manner as shown in Figure 8, if desired.

A removable dome 50 is fitted upon the upper end of the column 48 and may be detachably secured thereto by means of a set screw 51 of a suitable type whereby the dome may be removed when desired for the purpose of repair or replacement. The dome 50 is provided with vertically extending vents or slots 52 extending entirely around the circumference thereof. The dome is supported upon cross-braces 53 somewhat similar to the cross-braces 22 previously described upon which cross-braces is suspended a fan operating motor 54 similar to the motor 24 previously described. The motor 54 is hung within the upper end of the column 48 below the braces 53 and the braces 53 are so constructed as to allow air to pass vertically of the column 48 around the sides of the motor 54 and up into the dome 50 in the path indicated by the arrows. A fan 55 is carried by a vertical shaft 56, the fan being of the same type as that described and indicated by the numeral 35 having vertically extending blades especially formed to suck the air up from the column 48 into the dome 50 and then drive the air out through the vents or slots 52. The upper end of the shaft 56 is journaled in a bearing 57 at the upper end of the dome 50, and is also journaled in a bearing 58 at the upper end of the motor 54 and a bearing 59 at the lower end of the motor 54. The fan shaft consequently will be braced at three different points through its length. A suitable switch 54ª may be used for controlling the operation of the motor 54.

In Figure 9 there is shown a further embodiment of my invention, illustrating a base 60 supporting a column 61 having air inlet openings or vents 62. The column 61 is elongated near its upper end, as at 63, and supports a motor 64 which is hung therein in a manner such as is described and illustrated in Figure 7. A dome 65 is supported upon the upper end of the enlarged portion 63 of the column 61 and is provided with vertically extending apertures or vents 66. A vertically extending fan 67 is mounted within the dome 65 and a light housing 68 is carried by the upper end of the dome 65 within which is mounted a suitable light bulb 69. This light may be of any suitable or desired type for giving direct or indirect light without departing from the spirit of the invention, and may be controlled by a suitable switch 70. A suitable switch 71 is carried by the column 61 for controlling the operation of the motor 64 and the base 60 carries an inlet line 72 which may be connected with a motor and compressor or pump such as is illustrated in Figure 7, if desired.

It should be understood that a very simple fan and housing therefor have been provided for facilitating the conditioning of the air and the perfuming and disinfecting thereof, and that the fan is so mounted as to not only efficiently distribute the air, but also providing means for shielding the fan blades for preventing accidents to persons who might come into close contact therewith. The tray 16 may contain insecticide, dry ice, perfume, or any material or substance. If desired, a sponge may be saturated with the desired material over which a blast of air may be drawn for the purpose of impregnating the air with the fumes of the saturating solution in which the sponge may be immersed.

The present device is particularly adapted for use in most offices or other places where the air is likely to become stagnant through lack of proper circulation, and the entrance of a fresh supply, and is particularly advantageous in closely arranged rooms and offices where smoking is permitted. The arrangement of the dome and the drawing of the air through the base or columns of the device will provide means for either ventilating, cooling, humidifying, perfuming, fumigating or disinfecting the air.

It should be understood that in connection with the cooling or heating unit shown in Figure 7, or which might be applied to any of the other forms, a manual or thermostatic control might be employed without departing from the spirit of the invention to maintain a constant temperature.

It should be further understood that a very simple and efficient means has been provided to produce a complete circulation of air in all directions by forcing the air through the fluted shield dome from the center outwardly in all directions. The fan blades will at the same time be shielded to render the fan safe, the openings in the shield being sufficiently small to prevent injury to persons by direct contact with the fan blades.

It is obvious that the device is adapted for use as an air conditioning means by placing an electrical refrigerating unit within the housing below the fan and the device may be operated at a minimum expense and will present a very attractive and neat article of furniture. The device might also be utilized for controlling insects and other pests of like nature, by placing an insecticide in the tray, such as is illustrated in the form shown in Figure 3.

Having described the invention, what is claimed as new is:—

1. A device of the class described comprising a fan, a housing enclosing said fan, the wall of said housing having openings therein surrounding said fan, said wall intermediate the openings being substantially V-shaped in cross-section to add strength to said wall and conduct the flow of air outwardly through said openings.

2. A device of the class described comprising a fan, a housing enclosing said fan, the wall of said housing having elongated vertical openings therein constituting vents, the portion of the wall between openings being substantially V-shaped in cross-section upon the inner face to direct air which moves radially outward through the openings, and said fan having means for forcing a current of air through said openings from the center of the housing outwardly.

3. A fan of the class described comprising a plurality of elongated vertically arranged blades, a shaft for supporting said blades in radiating relation, each blade having an angularly bent fin bent at an incline to the longitudinal axis from a point near its outer lower edge to a point near its inner upper edge, a tongue bent diagonally across the upper and lower outer corners of each blade, the tongues being bent in the same direction and offset with respect to each other and the vertical axis of the blade, the lower tongues of the blades drawing air upwardly between the blades and the upper tongues driving air radially of the blades.

4. A fan of the class described comprising a plurality of elongated vertically arranged blades, each blade having near its lower end a forwardly bent portion extending forwardly at an angle to the upper portion of the blade and bent along an inclined line with respect to the longitudinal axis of the blade to provide an upward pulling action of the air, the upper portion of the blade providing means for expelling air from the blade at approximately right angles to the longitudinal axis of the blade.

5. A fan of the class described comprising a plurality of elongated vertically arranged blades, each blade having near its lower end a forwardly bent portion extending forwardly at an angle to the upper portion of the blade and bent along an inclined line with respect to the longitudinal axis of the blade to provide an upward pulling action of the air, the upper portion of the blade providing means for expelling air from the blade at approximately right angles to the longitudinal axis of the blade, and said blade having near its upper end adjacent one edge a forwardly bent tongue extending in the direction of rotation of the blade.

GEORGE CONWELL SHIPLEY.